United States Patent
Ishikawa et al.

(10) Patent No.: US 9,660,283 B2
(45) Date of Patent: May 23, 2017

(54) CURRENT MEASUREMENT DEVICE

(71) Applicant: Toyota Jidosha Kabushiki Kaisha, Toyota-shi, Aichi-ken (JP)

(72) Inventors: Yuji Ishikawa, Aichi-ken (JP); Ikuyasu Kato, Obu (JP); Takashi Yamamoto, Okazaki (JP); Takashi Yamada, Hekinan (JP); Keigo Suematsu, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 363 days.

(21) Appl. No.: 14/493,937

(22) Filed: Sep. 23, 2014

(65) Prior Publication Data

US 2015/0084638 A1 Mar. 26, 2015

(30) Foreign Application Priority Data

Sep. 25, 2013 (JP) .................................. 2013-198709

(51) Int. Cl.
*H01M 8/04* (2016.01)
*H01M 8/10* (2016.01)
(Continued)

(52) U.S. Cl.
CPC ... *H01M 8/04649* (2013.01); *H01M 8/04589* (2013.01); *H01M 8/1004* (2013.01)

(58) Field of Classification Search
CPC . H01M 8/02; H01M 8/04; H01M 8/10; G01R 31/3606
See application file for complete search history.

(56) References Cited

U.S. PATENT DOCUMENTS

2006/0046132 A1* 3/2006 Goebel ............... H01M 8/0258
429/434
2007/0279051 A1* 12/2007 Kataoka ............ H01M 8/04007
324/226

(Continued)

FOREIGN PATENT DOCUMENTS

JP 61264683 A 11/1986
JP 2005183296 A 7/2005

(Continued)

OTHER PUBLICATIONS

Machine Translation of: JP 2010/080164, Kikawa et al., Apr. 8, 2010.*

*Primary Examiner* — Kenneth Douyette
(74) *Attorney, Agent, or Firm* — Dinsmore & Shohl LLP

(57) ABSTRACT

A current measurement device includes a measurement part that is constituted by including a resistance part having a predetermined electric resistance value and a pair of current collector parts for extracting a potential difference generated by a current that flows the resistance part; a potential difference detector that is connected to the pair of current collector parts and detects a potential difference generated in the resistance part; and a current detector that detects the current that flows through the inside of a fuel cell. The measurement part is disposed to be integrated with one separator of the pair of separators and the pair of current collectors is disposed so as to overlap with the resistance part when seen from a direction orthogonal to the stacking direction of the cells.

15 Claims, 16 Drawing Sheets

(51) Int. Cl.
*G01R 31/36* (2006.01)
*H01M 8/04537* (2016.01)
*H01M 8/1004* (2016.01)

(56) References Cited

U.S. PATENT DOCUMENTS

2010/0035107 A1\* 2/2010 Kanie ............... H01M 8/04097
                                                   429/431
2011/0269046 A1   11/2011 Suematsu

FOREIGN PATENT DOCUMENTS

JP          4640661 B2    3/2011
JP          5146225 B2    2/2013

\* cited by examiner

STACKING DIRECTION OF CELLS

STACKING DIRECTION OF CELLS

STACKING DIRECTION OF CELLS

CURRENT MEASUREMENT DEVICE

INCORPORATION BY REFERENCE

The disclosure of Japanese Patent Application No. 2013-198709 filed on Sep. 25, 2013 including the specification, drawings and abstract is incorporated herein by reference in its entirety.

BACKGROUND OF THE INVENTION

1. Field of the Invention

The present invention relates to a current measurement device for measuring a current that flows through the inside of a fuel cell.

2. Description of Related Art

So far, as a current measurement device that is applied to a fuel cell that is constituted by stacking a plurality of cells and measures a current that flows through the inside of a fuel cell, a current measurement device that is constituted by disposing a plate-shaped current measurement part between adjacent cells is known (see, Japanese Patent No. 5146225, for example).

This Japanese Patent No. 5146225 discloses a current measurement device that includes a current measurement part that is constituted of a first electrode that comes into electrical contact with one cell of adjacent cells, a second electrode that comes into electrical contact with the other cell, and a plate-shaped resistor that electrically connects the respective electrodes.

Here, in Japanese Patent No. 5146225, since the current measurement part is constituted of a stacked body in which a pair of electrodes and a resistor are stacked in three or more layers in the stacking direction of cells, a thickness of the current measurement part itself in the stacking direction of cells becomes large.

Further, in Japanese Patent No. 5146225, since the current measurement part having a large thickness in the stacking direction of cells is constituted to be disposed between adjacent cells of a fuel cell, a thickness in the stacking direction of cells in the fuel cell increases, and there are problems such as mountability of the fuel cell is deteriorated and a heat content of the fuel cell becomes large.

SUMMARY OF THE INVENTION

The present invention provides a current measurement device that can measure a current that flows through the inside of a fuel cell while suppressing a thickness in the stacking direction of cells in a fuel cell from increasing.

The present invention intend to provide a current measurement device that is applied to a fuel cell that is constituted by stacking and disposing cells having a membrane electrode assembly that is obtained by forming an electrode layer on each of both surfaces of an electrolyte membrane, and a first separator and a second separator that sandwich the membrane electrode assembly, and measures a current that flows through the inside of the fuel cell.

An aspect of the present invention relates to a current measurement device that includes: a measurement part that is constituted by including a resistance part having a predetermined electric resistance value and a pair of current collector parts for extracting a potential difference generated by a current that flows the resistance part; a potential difference detector that is connected to the pair of current collector parts and detects a potential difference generated in the resistance part; and a current detector that detects a current that flows through the inside of a fuel cell based on the detected potential difference and the electric resistance value of the resistance part. The measurement part is disposed so as to be integrated with first separator and the pair of current collector parts is disposed so as to overlap with the resistance part when seen from a direction orthogonal to a stacking direction of cells.

Thus, when the pair of current collector parts in the measurement part is constituted by disposing so as to overlap with the resistance part when seen from the direction orthogonal to the stacking direction of cells, compared with a related art in which a measurement part is constituted of a pair of electrodes stacked in a stacking direction of cells and a resistor, a thickness of the measurement part itself can be suppressed from increasing.

Further, by disposing such that the measurement part of the current measurement device is integrated with the separator that is a constitutional element of a cell, compared with the related art in which the measurement part is disposed between cells, a thickness in the stacking direction of cells in a fuel cell can be suppressed from increasing.

Therefore, according to the present invention, a current measurement device that can measure the current that flows through the inside of a fuel cell while suppressing a thickness in the stacking direction of cell in a fuel cell from increasing can be realized.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
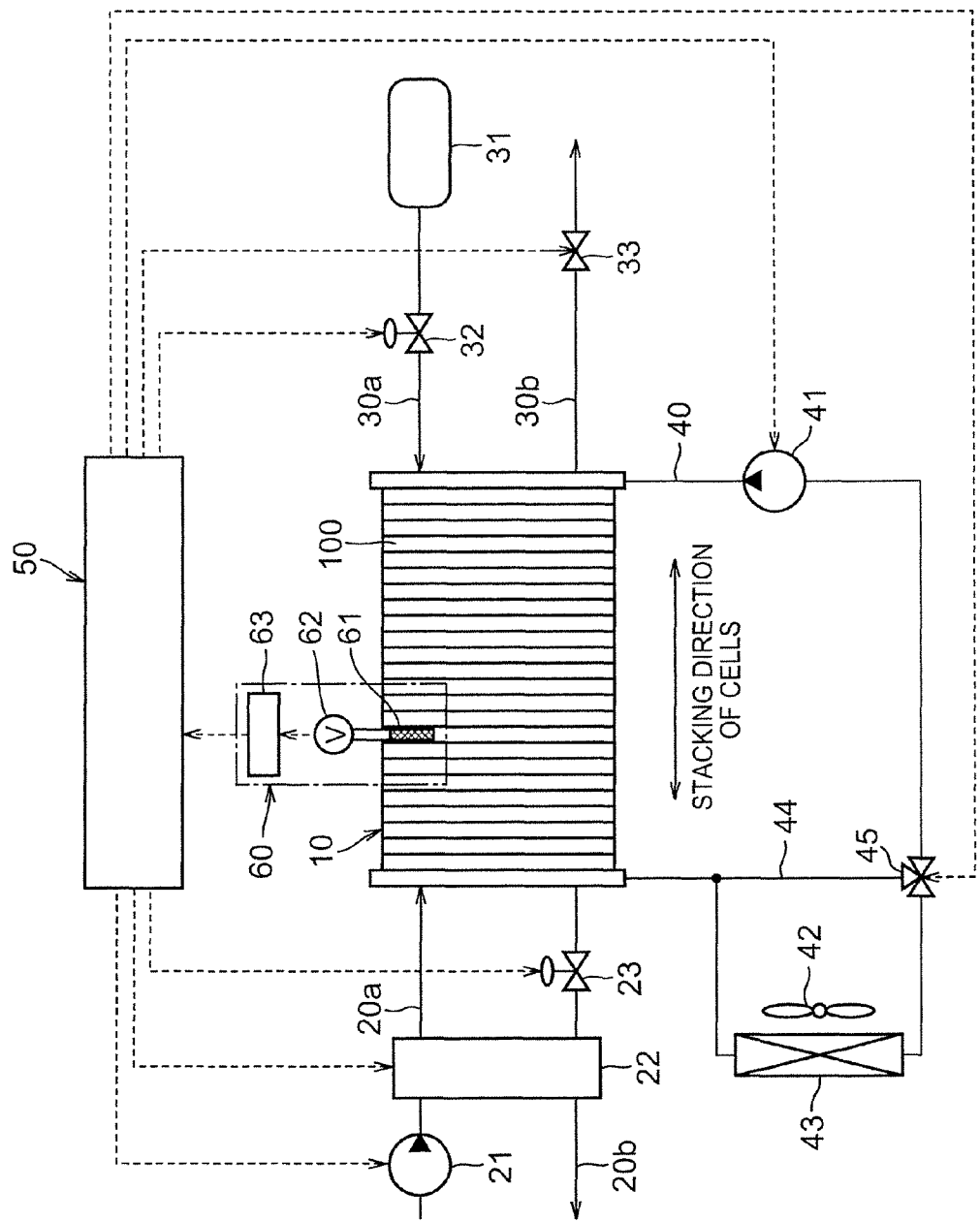
FIG. 1 is an overall block diagram of a fuel cell system to which a current measurement device according to a first embodiment is applied.

Hereinafter, embodiments of the present invention will be described with reference to the drawings. In the following respective embodiments, items the same or equivalent to the items described in the preceding embodiment are imparted with the same reference numerals and descriptions thereof may be omitted. Further, in the respective embodiments, when only a part of constitutional elements is described, regarding other parts of the constitutional elements, the constitutional elements described in the preceding embodiments can be applied.

First Embodiment

In the present embodiment, an example in which a current measurement device 60 of an embodiment of the present invention is applied to a fuel cell system that is mounted on a fuel cell vehicle that is one kind of an electric vehicle and outputs electric energy to an electric load such as auxiliary machines and the like of the vehicle will be described.

Firstly, a fuel cell system will be described. The fuel cell system includes, as shown in FIG. 1, a fuel cell 10 that outputs electric energy by making use of an electrochemical reaction between hydrogen and oxygen. The fuel cell 10 has a stack structure in which a plurality of cells 100 that is a minimum unit is stacked such that the respective cells 100 are electrically connected in series. In the present embodiment, a so-called solid polymer electrolyte fuel cell (PEFC) is adopted.

Figure 2:
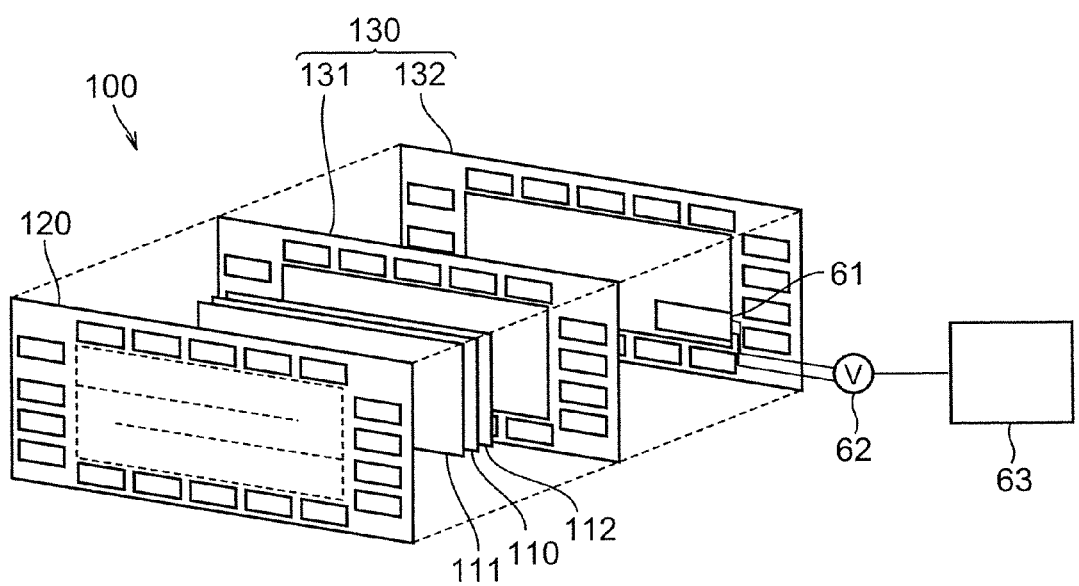
FIG. 2 is a schematic exploded perspective view of a cell of a fuel cell according to a first embodiment.

Each of the cells 100 includes, as shown in FIG. 2, a membrane electrode assembly 110 made of a pair of electrodes (anode, cathode) formed on both surfaces of an electrolyte membrane having ion permeability, a pair of separators 120, 130 that sandwiches the membrane electrode assembly 110, and the like.

The electrolyte membrane that constitutes the membrane electrode assembly 110 is an ion exchange membrane that is formed of a solid polymer material (for example, fluororesin) and has protonic conductivity and exhibits excellent electric conductivity in a wet condition. Further, a pair of electrodes that constitutes the membrane electrode assembly 110 is a catalyst layer having platinum or an alloy made of platinum and other metal as a catalyst and functions as an anode (hydrogen electrode) and a cathode (oxygen electrode).

Gas diffusion layers 111, 112 are disposed between the membrane electrode assembly 110 and the pair of separators 120 130. The gas diffusion layers 111, 112 are formed of a conductive member (for example, carbon cloth) having gas diffusivity.

Further, the pair of separators 120, 130 electrically connects the respective cells 100, plays a role of blocking a reaction gas that flows through one of the adjacent cells 100 from flowing in the other cell 100, and is formed of a plate-shaped member (for example, carbon plate) having conductivity.

Here, in the present embodiment, of the pair of separators 120, 130, the separator that faces an anode side of the membrane electrode assembly 110 is regarded as an anode side separator 120, and the separator that faces a cathode side of the membrane electrode assembly 110 is regarded as a cathode side separator 130.

The anode side separator 120 has many protruded parts formed by press molding or the like on a surface that faces the gas diffusion layer 111 on the anode side, and due to the protruded parts, a fuel gas passage 120a through which a fuel gas flows is formed.

Further, the anode side separator 120 includes a gasket 140 that prevents fuel gas from leaking from the inside of the cell 100 and is disposed on a surface on an opposite side from a surface that faces the gas diffusion layer 111.

Figure 3:
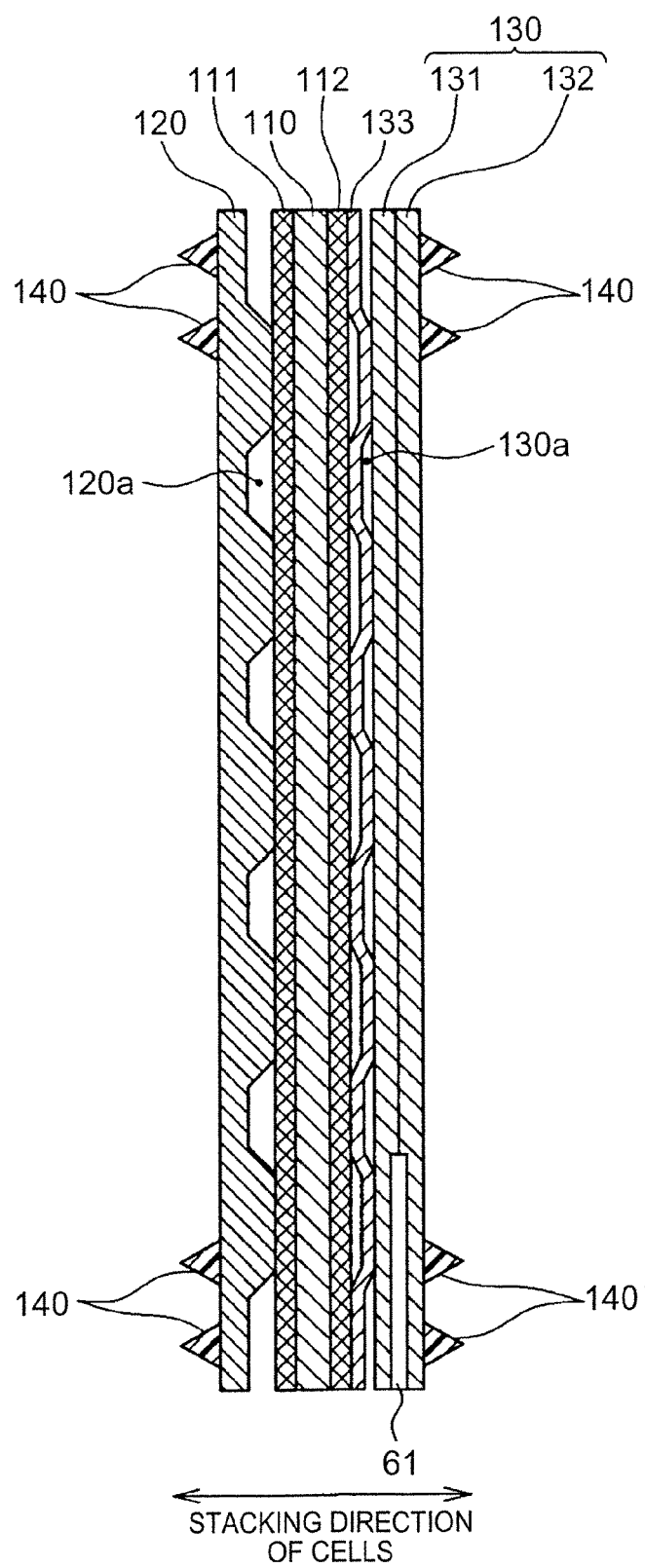
FIG. 3 is a schematic cross-sectional view of the cell of the fuel cell according to the first embodiment.

As shown in FIG. 3, an expanded metal 133 for forming an oxidant gas flow passage 130a through which an oxidant gas flows is disposed between the cathode side separator 130 and the cathode side gas diffusion layer 112. The expanded metal 133 is constituted of, for example, a metal plate in which many holes are formed by notches arranged in a staggered manner.

The cathode side separator 130 includes a gasket 140 that prevents oxidant gas from leaking from the inside of the cell 100 and is disposed on a surface on an opposite side from a surface that faces the expanded metal 133.

Further, in the cathode side separator 130, a measurement part 61 of the current measurement device 60 is constituted to be integrated therewith. Specifically, the cathode side separator 130 of the present embodiment is constituted of a joined body in which a first plate-shaped member 131 of which one plate surface comes into electrical contact with the membrane electrode assembly 110 via the gas diffusion layer 112, and a second plate-shaped member 132 that comes into electrical contact with the other plate surface in the first plate-shaped member 131 are joined. To each of the plate-shaped members 131, 132, at a joint part that joins the respective plate-shaped members 131, 132, the measurement part 61 of the current measurement device 60 is disposed. The measurement part 61 of the current measurement device 60 will be described below.

The fuel cell 10 outputs electric energy by the following electrochemical reaction that is generated inside of the respective cells 100 when fuel gas (hydrogen) and oxidizing gas (air) that are reaction gases are supplied to each of the cells 100.

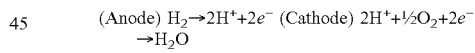

(Anode) $H_2 \rightarrow 2H^+ + 2e^-$ (Cathode) $2H^+ + \frac{1}{2}O_2 + 2e^- \rightarrow H_2O$ The electric energy output from the fuel cell 10 is measured by a voltage sensor (not shown) that detects an output voltage that is output as the fuel cell 10 as a whole and a current sensor (not shown) that detects an output current that is output as the fuel cell 10 as a whole.

Returning to FIG. 1, to the cathode (oxygen electrode) side of the fuel cell 10, an air supply passage 20a that supplies air that is an oxidizing gas to the fuel cell 10, and an air discharge passage 20b that externally discharges unreacted air discharged from the fuel cell 10 and generated water generated by the electrochemical reaction are connected.

On a most upstream side of the air supply passage 20a, an air pump 21 for pumping air suctioned from in air to the fuel cell 10 is disposed. Further, in the air discharge passage 20b, an air pressure control valve 23 that adjusts air pressure in the fuel cell 10 is disposed.

Further, the air supply passage 20a and the air discharge passage 20b are provided with a humidifier 22 for moving moisture in air flowed out of the air pressure control valve 23 to air pumped from the air pump 21.

On the anode (hydrogen electrode) side of the fuel cell 10, a hydrogen supply passage 30a for supplying hydrogen that is a fuel gas to the fuel cell 10 and a hydrogen discharge passage 30b for externally discharging a slight amount of unreacted hydrogen and generated water, which are discharged from the fuel cell 10 are connected.

On an uppermost upstream part of the hydrogen supply passage 30a, a hydrogen tank 31 in which pressurized hydrogen is filled is disposed, and, on a downstream side thereof, a hydrogen pressure control valve 32 for controlling pressure of hydrogen that is supplied to the fuel cell 10 is disposed.

Further, to the hydrogen discharge passage 30b, an electromagnetic valve 33 that is opened and closed at a predetermined time interval for externally discharging the unreacted hydrogen together with the generated water is disposed. Although generated water is not basically generated on the anode side by the electrochemical reaction in the cell 100, when the generated water penetrates from the cathode side to the anode side, the generated water may stand on the anode side. Therefore, in the present embodiment, the electromagnetic valve 33 is disposed to the hydrogen discharge passage 30b.

Now, the fuel cell 10 is necessary to be maintained at a constant temperature (for example, about 80° C.) during operation for making exert a high power generation efficiency. Therefore, a coolant circuit 40 for adjusting a temperature of the fuel cell 10 is connected to the fuel cell 10. The coolant circuit 40 includes a circulation pump 41 for circulating coolant to the fuel cell 10 and a radiator provided with an electric fan 42.

Further, the coolant circuit 40 includes a bypass flow passage 44 for flowing the coolant so as to circumvent the radiator 43. And, at a convergence point of a flow passage on the radiator 43 side and the bypass flow passage 44 in the coolant circuit 40, a flow passage switching valve 45 for adjusting a flow amount of the coolant that flows to the bypass flow passage 44 is disposed.

A controller 50 is a controller that is constituted of a well-known micro-computer made of a CPU and a memory and a peripheral circuits thereof, and controls various kinds of electric actuators that constitute a fuel cell system based on inputted signals and the like.

To an input side of the controller 50, in addition to the voltage sensor, current sensor and the like, which were described above, a current detection circuit 63 of a current measurement device 60 described below is connected, and detected signals of the various sensors and the current detection circuit 63 are input.

On the other hand, to an output side of the controller 50, various electric actuators such as the air pump 21, the air pressure control valve 23, the hydrogen pressure control valve 32, the electromagnetic valve 33, the circulation pump 41, the flow passage switching valve 45 and the like, which were described above, are connected.

Next, the current measurement device 60 of the present embodiment will be described in more detail. The current measurement device 60 of the present embodiment is constituted such that a local current that flows a local site of the cell 100 that is a current measurement target (hereinafter, referred to as measurement target cell 100) among the respective cells 100 is measured.

The current measurement device 60 includes the measurement part 61 that is disposed integrally with the cathode side separator 130 of the measurement target cell 100, a potential difference detection circuit 62 for detecting a potential difference generated by a current that flows the measurement part 61, and the current detection circuit 63 that detects the current that flows the measurement part 61 and outputs to the controller 50.

The measurement part 61 is disposed, as shown in FIG. 3, at a joint part of first and second plate-shaped members 131, 132 that constitute the cathode side separator 130 so as to be integrated with the cathode side separator 130. The measurement part 61 of the present embodiment is disposed at a site that corresponds to a flow passage outlet side of the oxidant gas flow passage 130a in the cathode side separator 130 such that a current on the flow passage outlet side of the oxidant gas flow passage 130a flows. A place to which the measurement part 61 in the cathode side separator 130 is disposed is not limited particularly to a place that faces the flow passage outlet side of the oxidant gas flow passage 130a but may be any place as long as it is a place that faces the oxidant gas flow passage 130a.

Figure 4:
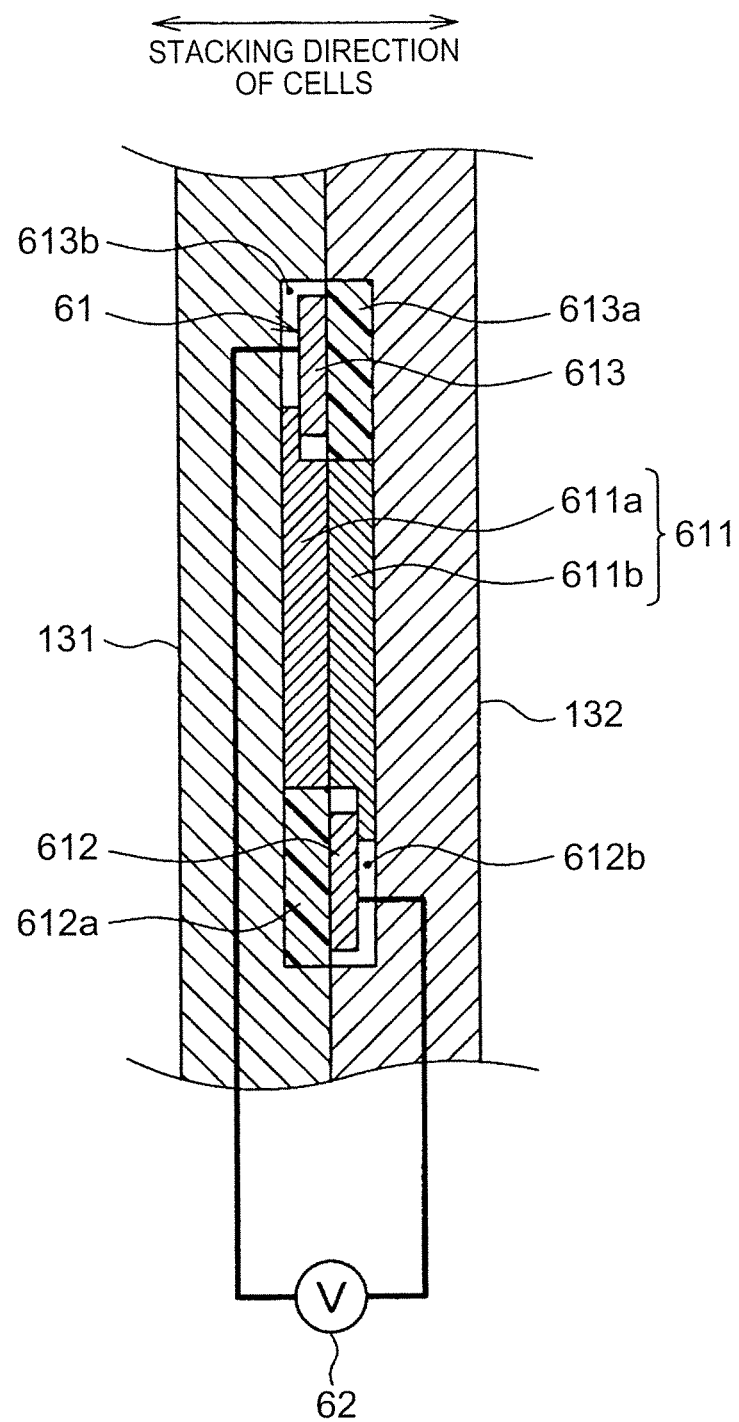
FIG. 4 is a schematic cross-sectional view of a measurement part according to the first embodiment.

The measurement part 61 of the present embodiment is constituted, as shown in FIG. 4, by coming into electrical contact with the respective plate-shaped members 131, 132, and by including a resistance part 611 having a predetermined electric resistance value and a pair of current collector parts 612, 613 for extracting a potential difference generated when a current flows to the resistance part 611.

The resistance part 611 of the present embodiment is disposed between the respective plate-shaped members 131, 132 so as to come into direct contact with the respective plate-shaped members 131, 132. Specifically, the resistance part 611 is constituted of a plate-shaped first resistor 611a formed on a surface of a site that faces a second plate-shaped member 132 in the first plate-shaped member 131 and a plate-shaped second resistor 611b formed on a surface of a site that faces the first resistor 611a in the second plate-shaped member 132. The first and second resistors 611a, 611b of the present embodiment are constituted of a metal thin sheet.

The first and second resistors 611a, 612b of the present embodiment additionally include sites that do not overlap with each other (non-overlapped part) when seen from a direction orthogonal to the stacking direction of the cells 100. In the present embodiment, the non-overlapped part in the first resistor 611a is formed so as to overlap with a second current collector part 613 described below when seen from the stacking direction of the cells 100. Further, the first resistor 611a is formed such that a thickness of a site that faces the second current collector part 613 described below is thinner than other sites.

Further, in the present embodiment, the non-overlapped part in the second resistor 611b is formed so as to overlap with a first current collector part 612 described below when seen from the stacking direction of the cells 100. Further, the second resistor 611b is formed such that a thickness of a site that faces the first current collector part 612 described below is thinner than other sites. The first resistor 611a and the second resistor 611b become one resistance part 611 by bringing sites that do not face a pair of current collector part 612, 613 into contact with each other when the first, second plate-shaped members 131,132 that constitute the cathode side separator 130 are joined.

Each of the pair of current collector parts 612, 613 (first current collector part 612, second current collector part 613) is disposed so as to overlap with the resistance part 611 when seen from a direction orthogonal to the stacking direction of the cell 100. That is, each of the current collector parts 612, 613 is disposed so as to be arranged in series with respect to the resistance part 611 in a direction orthogonal to the stacking direction of the cells 100.

Further, each of the current collector parts 612, 613 is electrically connected to sites that do not overlap with each other in the resistance part 611 when seen from a direction orthogonal to the stacking direction of the cells 100 in the resistance part 611.

Specifically, the first current collector part 612 is formed on a surface that faces the second plate-shaped member 132 in the first plate-shaped member 131 via an insulating resin 612a and is connected to one end part side (a lower side in FIG. 4, an internal direction of a fuel cell) in a direction orthogonal to the stacking direction of the cells 100 in the resistance part 611 (second resistor 611b).

On the other hand, the second current collector part 613 is formed on a surface that faces the first plate-shaped member 131 in the second plate-shaped member 132 via the insulating resin 613a and is connected to the other end part side (an upper side in FIG. 4, an external direction of a fuel cell) in a direction orthogonal to the stacking direction of the cells 100 in the resistance part 611 (second resistor 611b).

Further, a gap 612b is disposed between the first current collector part 612 and the second plate-shaped member 132 so as to electrically insulate the first current collector part 612 and the second plate-shaped member 132. Similarly, a gap 613b is disposed between the second current collector part 613 and the first plate-shaped member 131 so as to electrically insulate the second current collector part 613 and the first plate-shaped member 131. In the present embodiment, the insulating resins 612a, 613a and the gaps 612b, 613b constitute an "insulating part" that insulates the cathode side separator 130 and the respective current collector parts 612, 613.

To the pair of current collector parts 612, 613, the potential difference detection circuit 62 is connected via a potential detection wiring in which a conductor is covered with an insulator. This potential difference detection circuit 62 is a circuit that detects a potential difference of the pair of current collector parts 612, 613 and outputs the detected signal to the current detection circuit 63. A potential difference of the pair of current collector parts 612, 613 is a potential difference generated when a current flows to the resistance part 611. In the present embodiment, the potential difference detection circuit 62 constitutes a potential difference detector that detects a potential difference generated when a current flows to the resistance part 611.

The current detection circuit 63 is a current detection device that detects a local current (a current that flows the measurement part 61) that flows through a local site of the measurement target cell 100 by carrying out an operational treatment with a detected signal of the potential difference detection circuit 62, and the electric resistance value of the resistance part 611.

Next, a current measurement method due to the current measurement device 60 will be described. When hydrogen and air are supplied to the fuel cell 10, power generation of the fuel cell 10 is started. In the cathode side separator 130, a current flows from the first plate-shaped member 131 side to the second plate-shaped member 132 side. In the measurement part 61 of the current measurement device 60, a current flows from the first resistor 611a to the second resistor 611b of the resistance part 611.

At this time, the potential difference detection circuit 62 detects a potential difference of the pair of current collector parts 612, 613. Then, in the current detection circuit 63, a current value that flows to the measurement part 61 is calculated by performing an operational treatment in which the potential difference detected by the potential difference detection circuit 62 is divided with an electric resistance value of the resistance part 611 memorized in advance in a memory. After that, the current detection circuit 63 outputs a current value calculated by the above-described operational treatment to the controller 50.

In the controller 50, a current value from the current detection circuit 63 is acquired as local current that flows a local site of the measurement target cell 100. The controller 50 supervises a power generation state of the fuel cell 10, a moisture content inside of the fuel cell 10 and the like based on the local current acquired from the current measurement device 60, and executes control of a supply amount and supply pressure of air, supply pressure of hydrogen, a circulation amount of coolant and the like. Thus, efficiency and reliability of the fuel cell system are improved.

In the present embodiment described above, the pair of current collector parts 612, 613 in the measurement part 61 of the current measurement device 60 is constituted by disposing so as to overlap with the resistance part 611 when seen from a direction orthogonal to the stacking direction of the cells 100. According to this, compared with a related art in which the measurement part 61 is constituted of a pair of electrodes that is stacked in the stacking direction of the cells 100 and a resistor, a thickness of the measurement part 61 itself can be suppressed from increasing.

Further, in the present embodiment, the measurement part 61 of the current measurement device 60 is constituted by disposing to be integrated with the cathode side separator 130 that is a constituent element of the cell 100. According to this, compared with the related art in which the measurement part 61 is disposed between the cells 100, a thickness in the stacking direction of the cells 100 in the fuel cell 10 can be suppressed from increasing.

Further, in the present embodiment, a constitution in which the resistance part 611 is directly brought into contact with the cathode side separator 130 is adopted. According to this, compared with a constitution in which the resistor is brought into contact with the cell 100 via a pair of electrodes like the related art, a variation of the contact resistance in the measurement part 61 can be suppressed from affecting on measurement accuracy of a current.

Therefore, according to the present embodiment, the current measurement device 60 that can measure a current that flows the inside of the fuel cell 10 while suppressing a thickness in the stacking direction of the cells 100 in the fuel cell 10 from increasing can be realized. As a result, degradation of mountability of the fuel cell 10 and an increase in the heat content of the fuel cell 10 associated with application of the current measurement device 60 can be suppressed.

In addition, in the present embodiment, the pair of current collector parts 612; 613 is electrically connected to sites that do not overlap with each other in the resistance part 611 when the resistance part 611 is seen from a direction orthogonal to the stacking direction of the cells 100.

According to this, since a potential difference between two different points in the stacking direction of the cells 100 in the resistance part 611 is constituted to be extracted by the pair of current collector parts 612, 613, in the current measurement device 60, among currents that flow through the fuel cell 10, a current that flows in the stacking direction of the cell 100 can be measured.

Further, in the present embodiment, the insulating resins 612a, 613a and gaps 612b, 613b are constituted to be interposed between the respective current collector parts 612, 613 and the cathode side separator 130.

According to this, since the respective current collector parts 612, 613 and the cathode side separator 130 are insulated therebetween, potentials that are extracted from the respective current collector parts 612, 613 can be suppressed from varying due to a potential of the cathode side separator 130. Thus, detection accuracy of a potential difference generated in the resistance part 611 in the potential difference detection circuit 62 can be improved.

Figure 5:
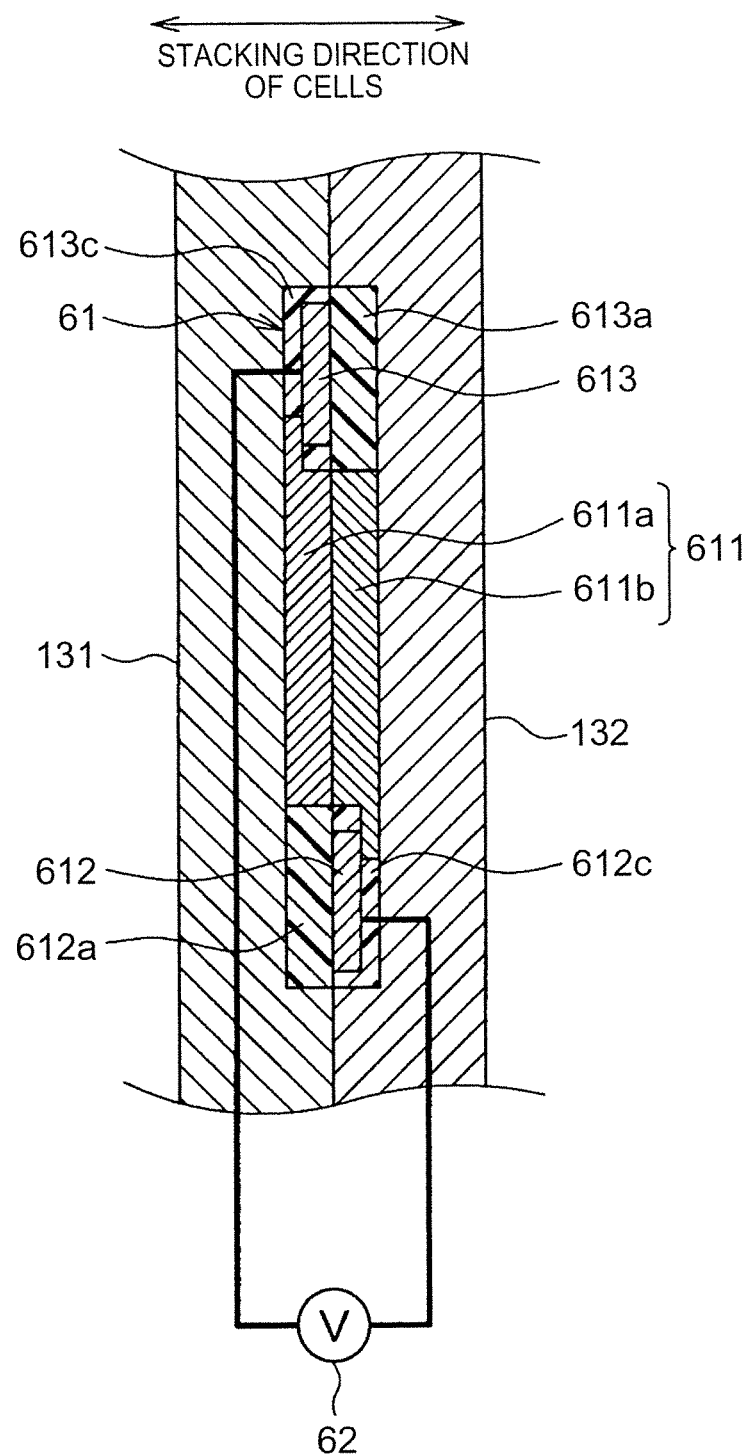
FIG. 5 is a schematic cross-sectional view that shows a modification example of the measurement part according to the first embodiment.

Now, in the present embodiment, an example in which the gaps 612$b$, 613$b$ are disposed between the first current collector part 612 and the second plate-shaped member 132, and between the second current collector part 613 and the first plate-shaped member 131 was described. However, the present invention is not limited thereto. For example, as shown in FIG. 5, the insulating resins 612$c$, 613$c$ may be disposed between the first current collector part 612 and the second plate-shaped member 132, and between the second current collector part 613 and the first plate-shaped member 131.

Second Embodiment

Next, a second embodiment will be described. In the present embodiment, parts the same or equivalent to the first embodiment are omitted from describing or simplified in description.

Figure 6:
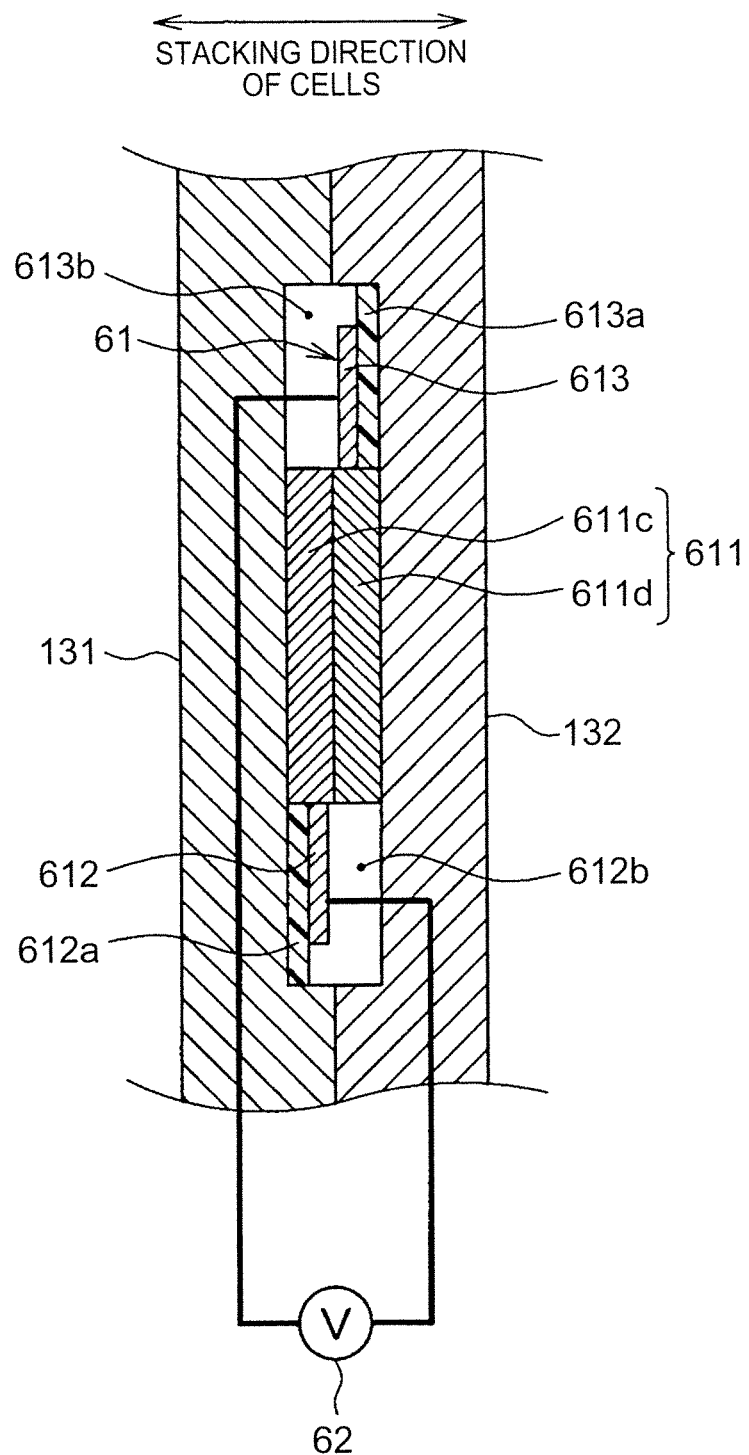
FIG. 6 is a schematic cross-sectional view of a measurement part according to a second embodiment.

The resistance part 611 of the present embodiment is constituted of plate-shaped first and second resistors 611$c$, 611$d$ that are disposed so as to overlap with each other, as shown in FIG. 6, when seen from a direction that is orthogonal to the stacking direction of the cells 100. The first, second resistors 611$c$, 611$d$ of the present embodiment are constituted of a metal thin sheet.

Further, regarding the pair of current collector parts 612, 613, the first current collector part 612 is electrically connected to the first resistor 611$c$ formed on the first plate-shaped member 131, and the second current collector part 613 is electrically connected to the second resistor 611$d$ formed on the second plate-shaped member 132.

Other constitutions and operations are the same as the first embodiment. According to the current measurement device 60 of the present embodiment, in the same manner as the first embodiment, the current that flows through the inside of the fuel cell 10 can be measured while suppressing a thickness in the stacking direction of the cells 100 in the fuel cell 10 from increasing.

Figure 7:
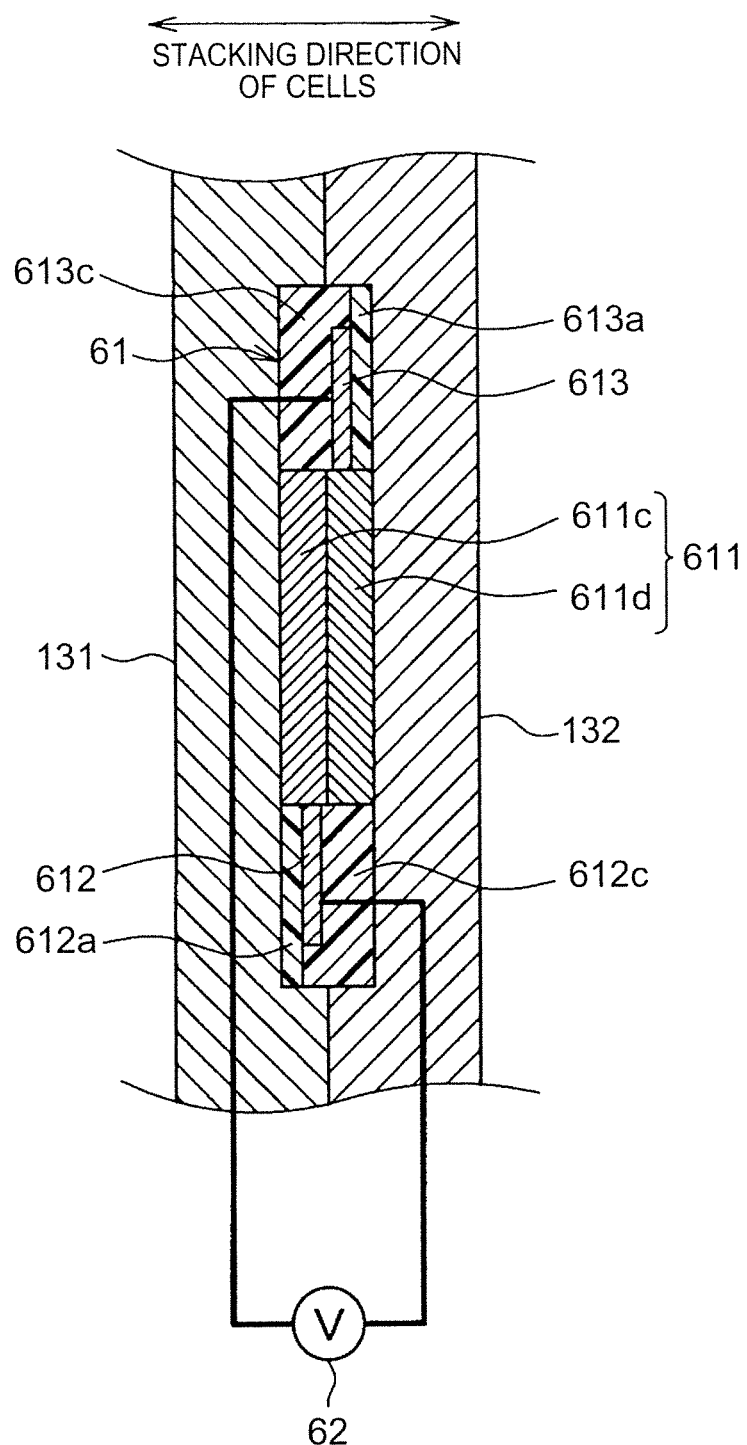
FIG. 7 is a schematic cross-sectional view that shows a modification example of the measurement part according to the second embodiment.

As shown in FIG. 7, the gaps 612$b$, 613$b$ disposed between the first current collector part 612 and the second plate-shaped member 132, and between the second current collector part 613 and the first plate-shaped member 131 may be changed to the insulating resins 612$c$, 613$c$. This is the same also in subsequent embodiments.

Third Embodiment

Next, a third embodiment will be described. In the present embodiment, parts the same or equivalent to the second embodiment are omitted from describing or simplified in description.

Figure 8:
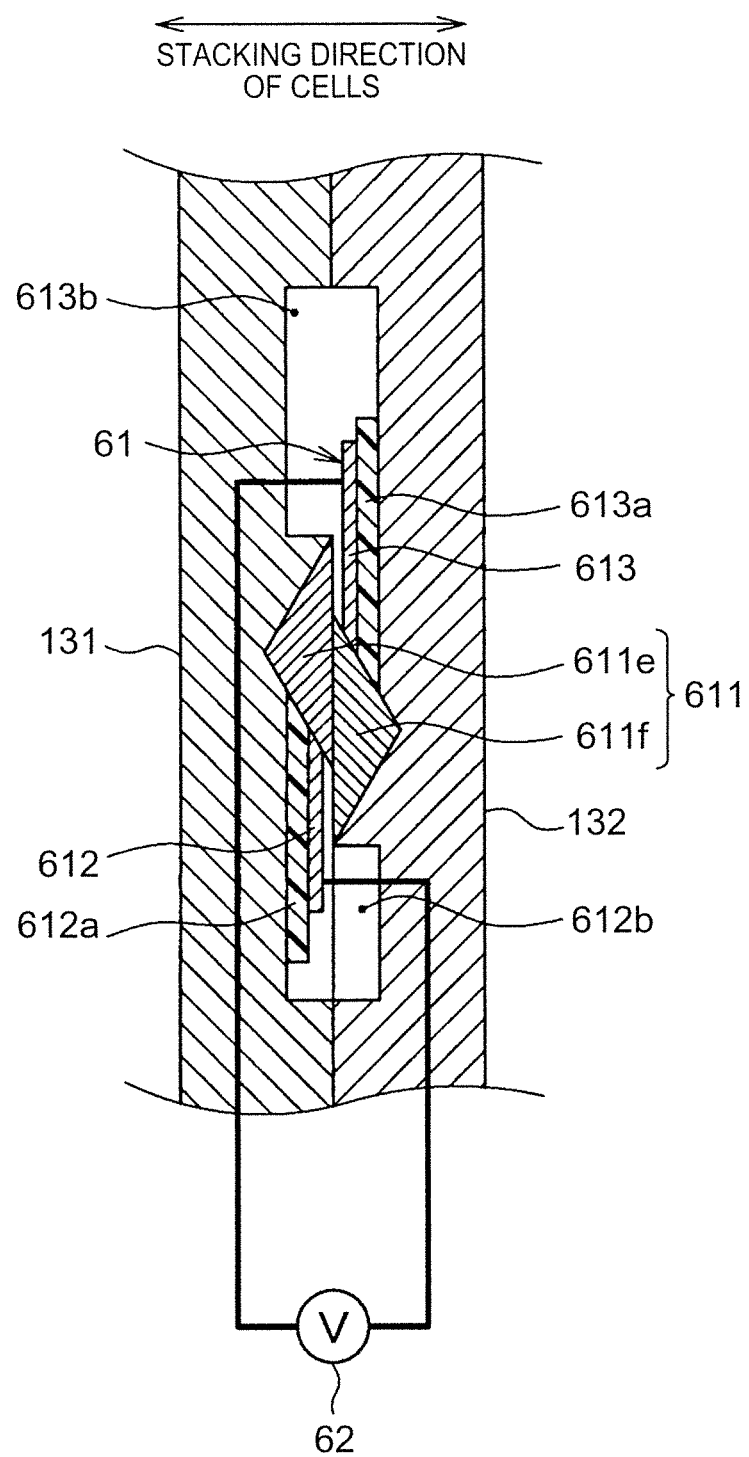
FIG. 8 is a schematic cross-sectional view of a measurement part according to a third embodiment.

The resistance part 611 of the present embodiment is constituted of conical first and second resistors 611$e$, 611$f$ that are disposed so as to partially overlap with each other as shown in FIG. 8 when seen from a direction that is orthogonal to the stacking direction of the cells 100. The first, second resistors 611$e$, 611$f$ of the present embodiment are constituted of a metal block.

Specifically, the first resistor 611$e$ of the present embodiment is disposed to the first plate-shaped member 131 such that a bottom surface side thereof faces the second plate-shaped member 132. Similarly, the second resistor 611$f$ of the present embodiment is disposed to the second plate-shaped member 132 such that a bottom surface side thereof faces the first plate-shaped member 131.

Figure 9:
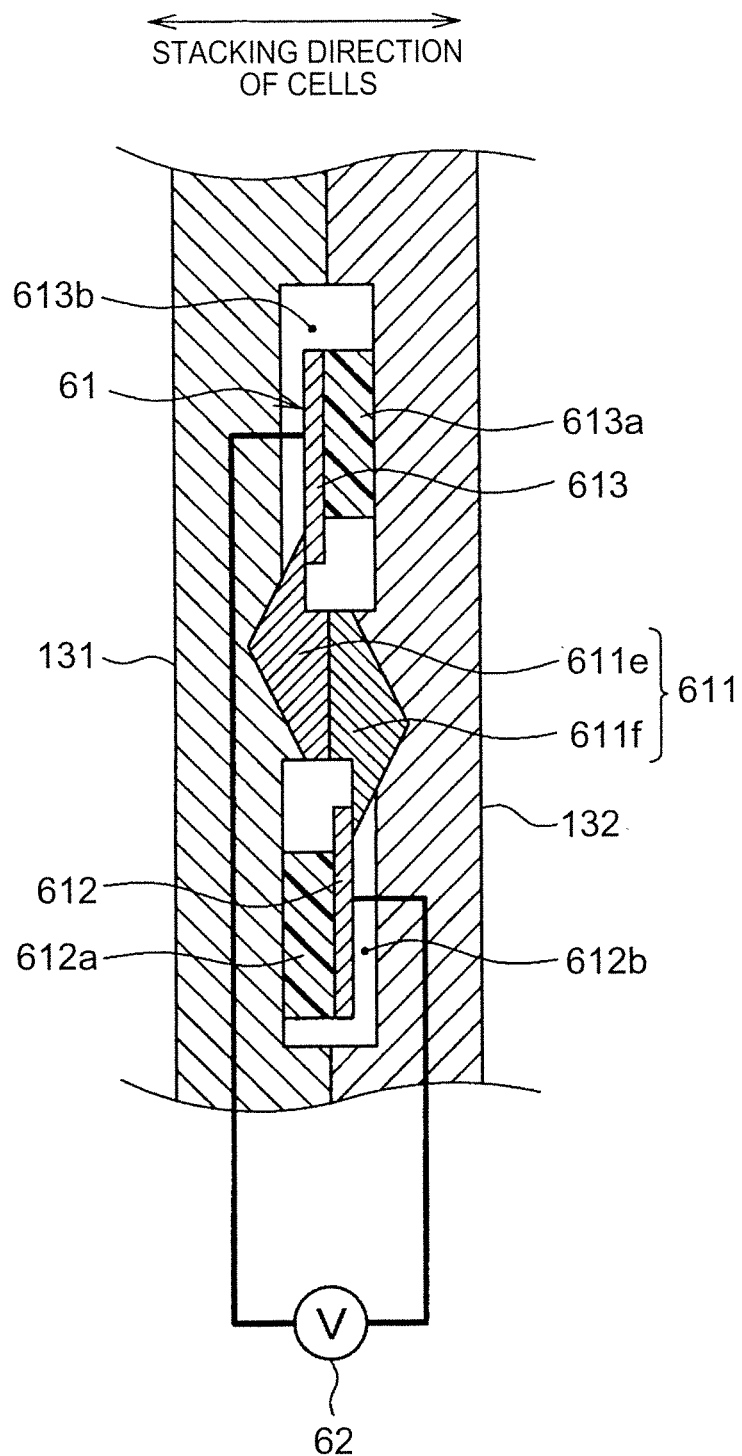
FIG. 9 is a schematic cross-sectional view that shows a modification example of the measurement part according to the third embodiment.

Other constitutions and operations are the same as the second embodiment. According to the current measurement device 60 of the present embodiment, in the same manner as the second embodiment, the current that flows through the inside of the fuel cell 10 can be measured while suppressing a thickness in the stacking direction of the cells 100 in the fuel cell 10 from increasing. As shown in FIG. 9, like the first embodiment, the first current collector part 612 may be electrically connected to the second resistor 611$f$ formed on the second plate-shaped member 132, and the second current collector part 613 may be electrically connected to the first resistor 611$e$ formed on the first plate-shaped member 131. Further, regarding shapes of the first, second resistors 611$e$, 611$f$ may be any one of a cylinder, a triangular prism, a triangular pyramid, a square pyramid or the like.

Fourth Embodiment

Next, a fourth embodiment will be described. In the present embodiment, parts the same or equivalent to the first embodiment are omitted from describing or simplified in description.

Figure 10:
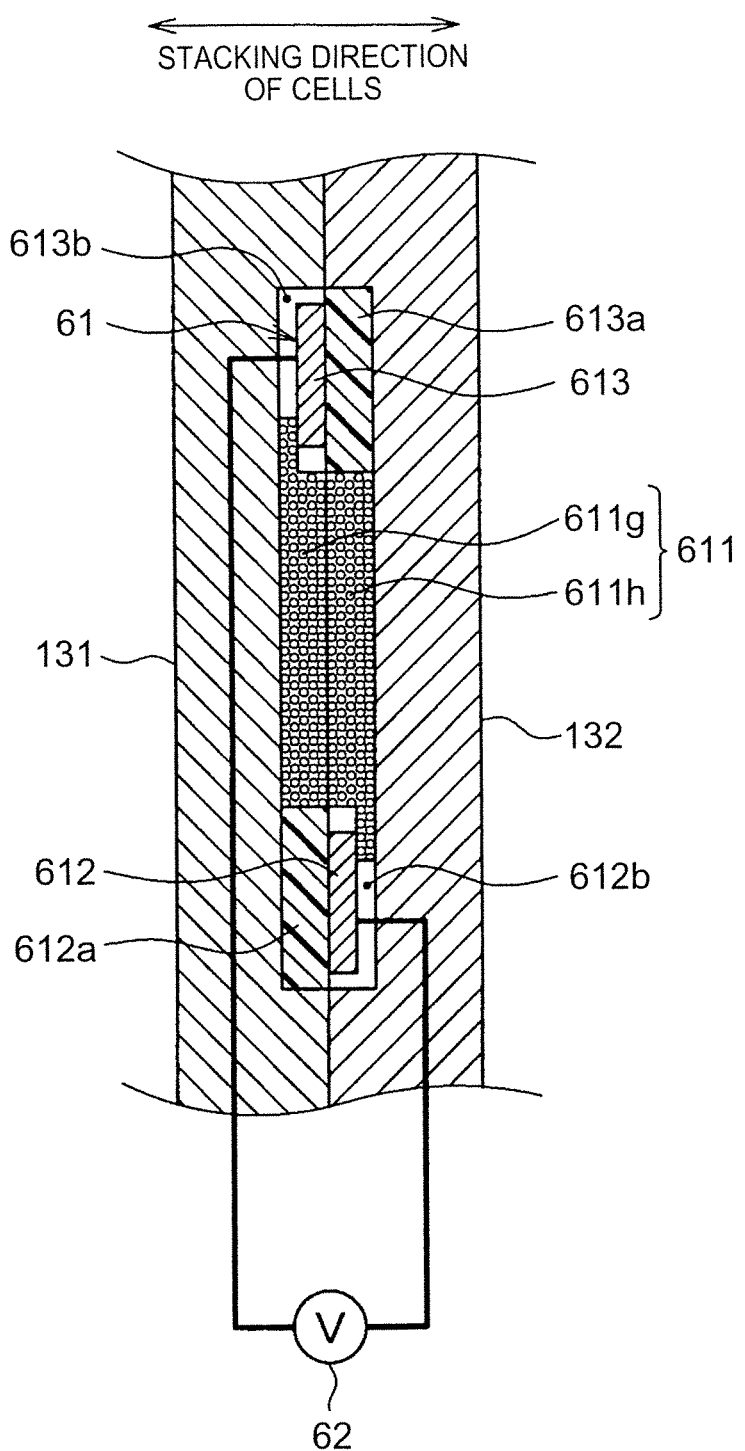
FIG. 10 is a schematic cross-sectional view of a measurement part according to a fourth embodiment.

While in the above-described first embodiment, the respective resistors 611$a$, 611$b$ are constituted of the metal thin sheet, in the present embodiment, as shown in FIG. 10, the respective resistors 611$g$, 611$h$ are constituted of a conductive member made of many metal particles.

Figure 11:
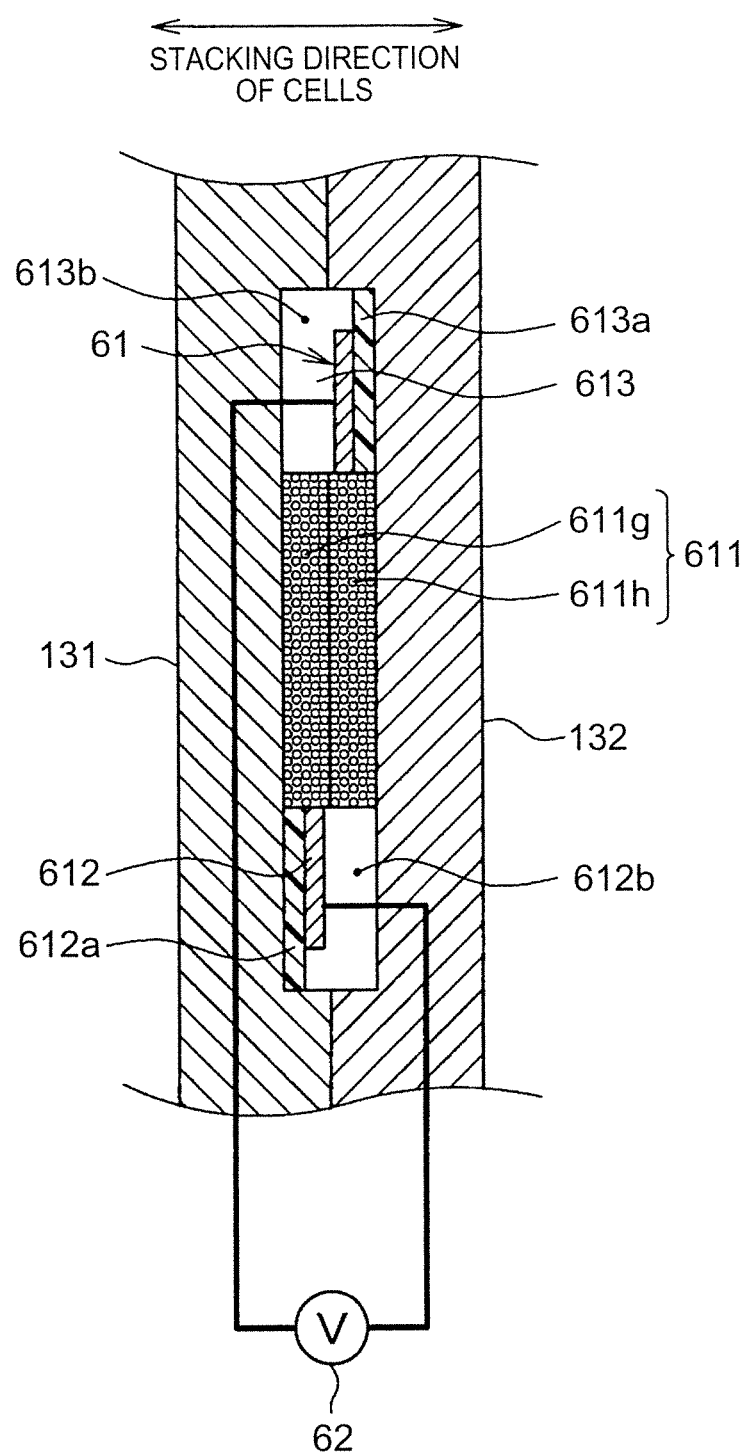
FIG. 11 is a schematic cross-sectional view that shows a modification example of the measurement part according to the fourth embodiment.

Other constitutions and operations are the same as the first embodiment. According to the current measurement device 60 of the present embodiment, in the same manner as the first embodiment, the current that flows through the inside of the fuel cell 10 can be measured while suppressing a thickness in the stacking direction of the cells 100 in the fuel cell 10 from increasing. As shown in FIG. 11, the respective resistors 611$c$, 611$d$ in the second embodiment may be changed to the conductive member made of many metal particles. It goes without saying that the respective resistors 611$e$, 611$f$ in the third embodiment may be changed to the conductive member made of many metal particles.

Fifth Embodiment

Next, a fifth embodiment will be described. In the present embodiment, parts the same or equivalent to the first embodiment are omitted from describing or simplified in description.

Figure 12:
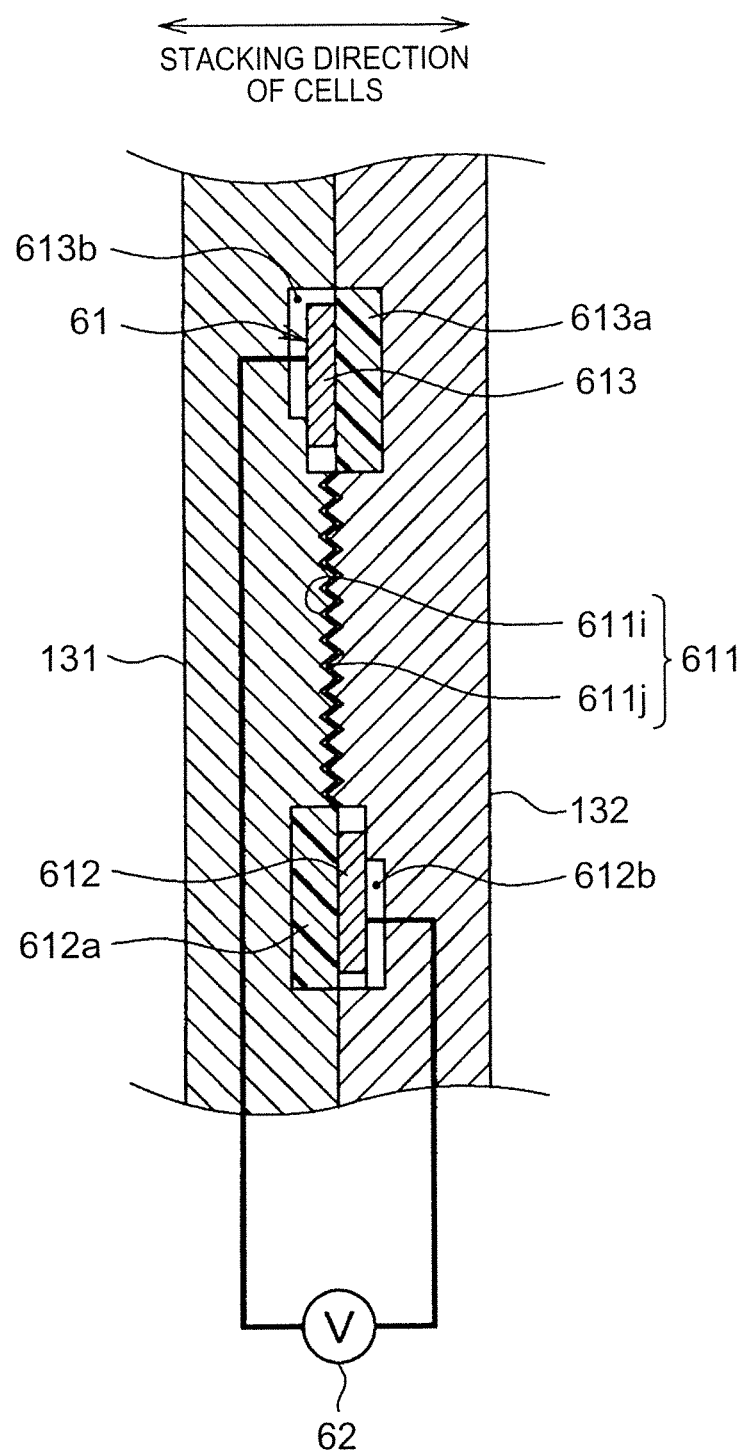
FIG. 12 is a schematic cross-sectional view of a measurement part according to a fifth embodiment.

In the present embodiment, as shown FIG. 12, a coupled part itself when the first, second plate-shaped members 131, 132 that constitute the cathode side separator 130 are coupled with each other is made to function as the resistance part 611.

Specifically, a first coupling part 611$i$ that couples with the second plate-shaped member 132 in the first plate-shaped member 131, and a second coupling part 611$j$ that couples with the first plate-shaped member 131 in the second plate-shaped member 132 are subjected to a surface treatment such that surface roughness becomes larger. In the present embodiment, the coupling part 611$i$ in the first plate-shaped member 131 constitutes the first resistor, and the coupling part 611$j$ in the second plate-shaped member 132 constitutes the second resistor.

Further, in the pair of the current collector parts 612, 613 of the present embodiment, the first current collector part 612 is electrically connected to the second coupling part 611*j* that constitutes the second resistor, and the second current collector part 613 is electrically connected to the first coupling part 611*i* that constitutes the first resistor.

Other constitutions and operations are the same as the first embodiment. According to the current measurement device 60 of the present embodiment, in the same manner as the first embodiment, the current that flows through the inside of the fuel cell 10 can be measured while suppressing a thickness in the stacking direction of the cells 100 in the fuel cell 10 from increasing.

Figure 13:
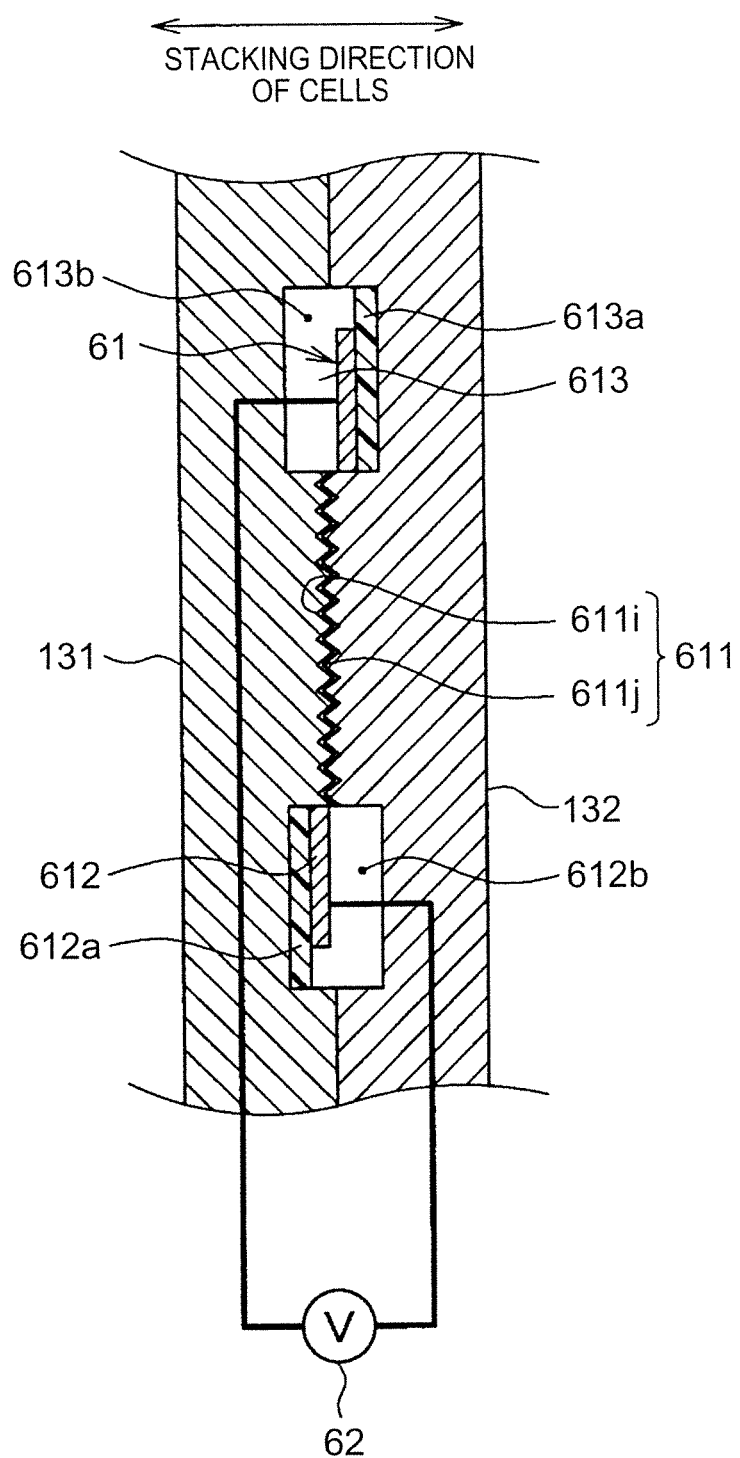
FIG. 13 is a schematic cross-sectional view that shows a modification example of the measurement part according to the fifth embodiment.

In particular, according to the constitution of the present embodiment, by making the first, second plate-shaped members 131, 132 themselves of the cathode side separator 130 function as the resistance part 611, the number of components of the current measurement device 60 can be reduced. Thus, the current measurement device 60 can be realized in a more simpler constitution. As shown in FIG. 13, in the pair of the current collector parts 612, 613, the first current collector part 612 may be electrically connected to the first coupling part 611*i*, and the second current collector part 613 may be electrically connected to the second coupling part 611*j*.

Other Embodiments

In the above, embodiments of the present invention were described. However, the present invention is not limited to the above-described embodiments and can be optionally changed. For example, as shown below, various modifications can be applied.

Figure 14:
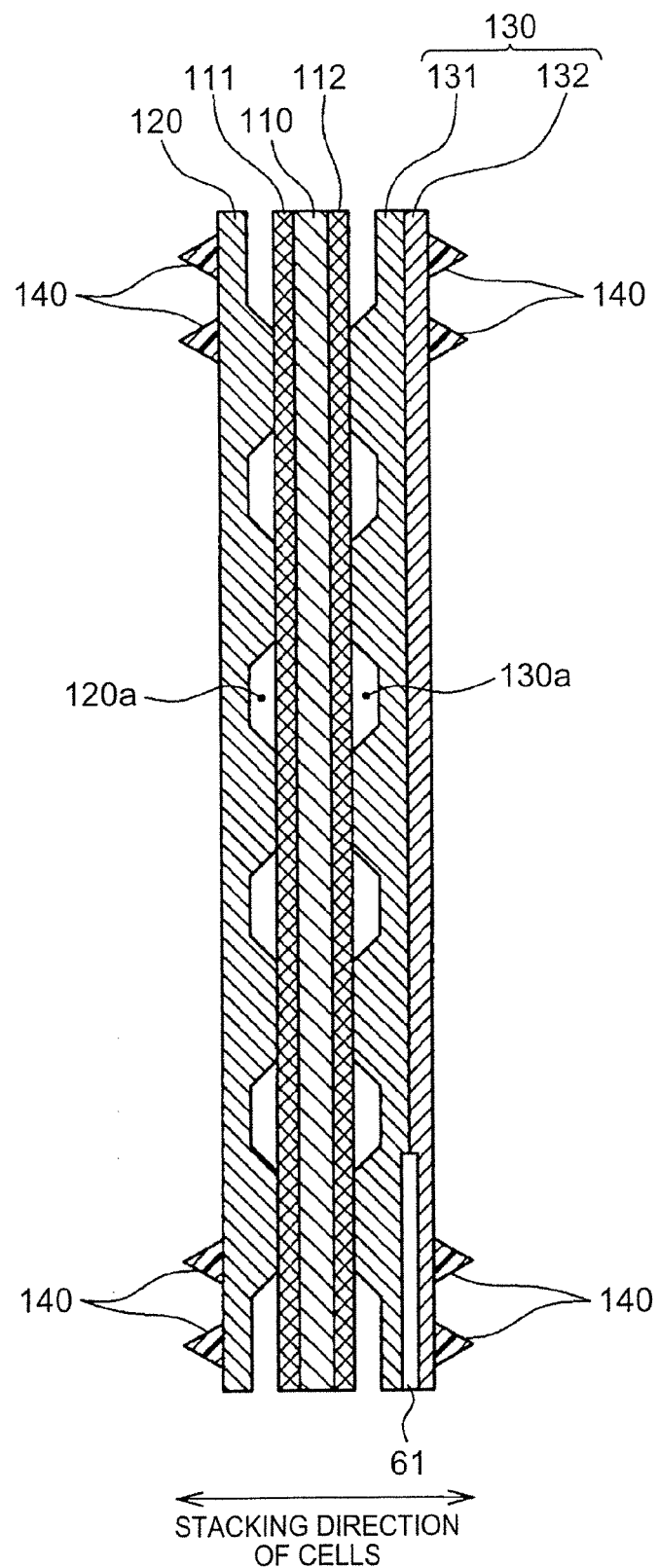
FIG. 14 is a schematic cross-sectional view of a cell of a fuel cell according to another embodiment.

(1) In the above-described respective embodiments, an example in which the expanded metal 133 that forms the oxidant gas flow passage 130*a* between the cathode side separator 130 and the cathode side gas diffusion layer 112 is disposed was described. However, the present invention is not limited thereto. For example, as shown in FIG. 14, the expanded metal 133 is discarded, and the oxidant gas flow passage 130*a* may be formed in the first plate-shaped member 131 that constitutes the cathode side separator 130.

Figure 15:
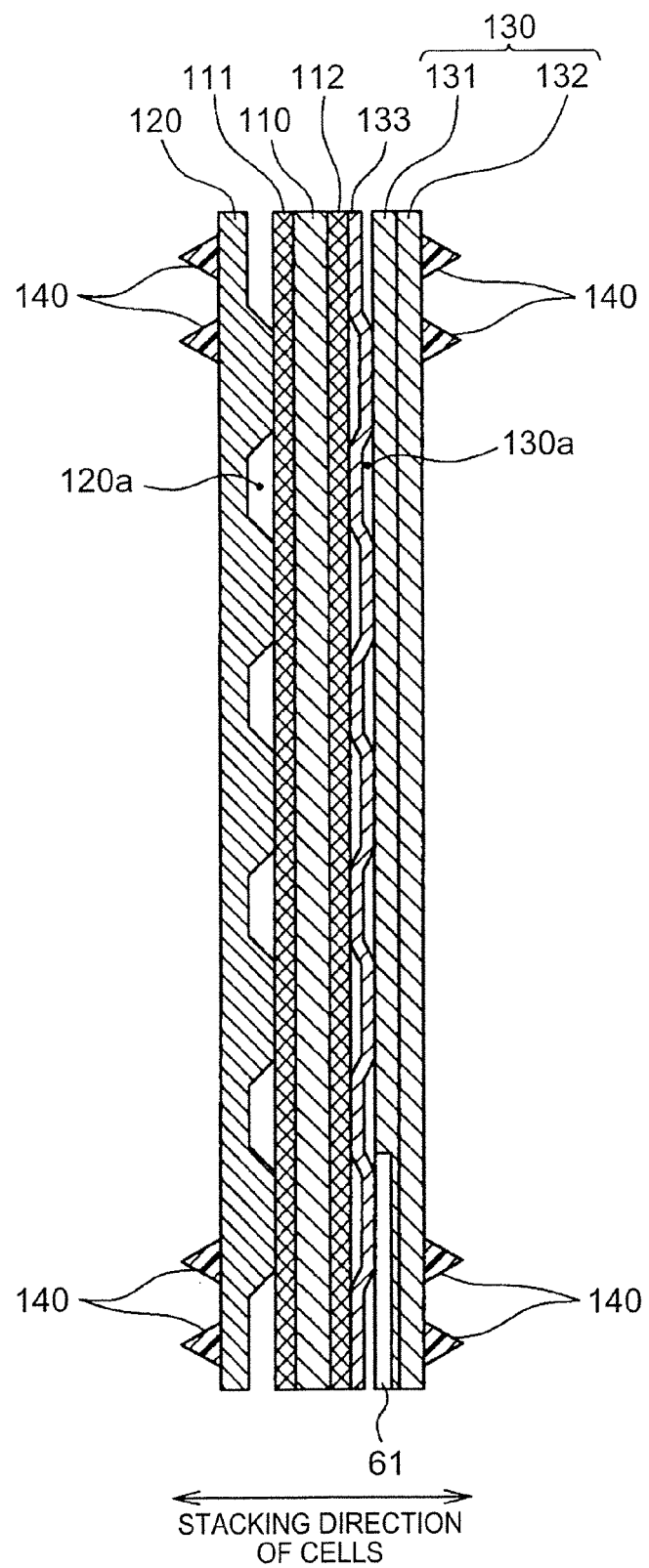
FIG. 15 is a schematic cross-sectional view of a cell of a fuel cell according to another embodiment.

(2) In the above-described respective embodiments, an example in which the measurement part 61 of the current measurement device 60 is disposed at a joint part that joins the first plate-shaped member 131 and the second plate-shaped member 132 that constitutes the cathode side separator 130 each other was described. However, the present invention is not limited thereto. For example, as shown in FIG. 15, the measurement part 61 of the current measurement device 60 may be disposed on a surface of a site (the first plate-shaped member 131) that faces the membrane electrode assembly 110 in the cathode side separator 130. In this case, the cathode side separator 130 may be constituted of one plate-shaped member.

Figure 16:
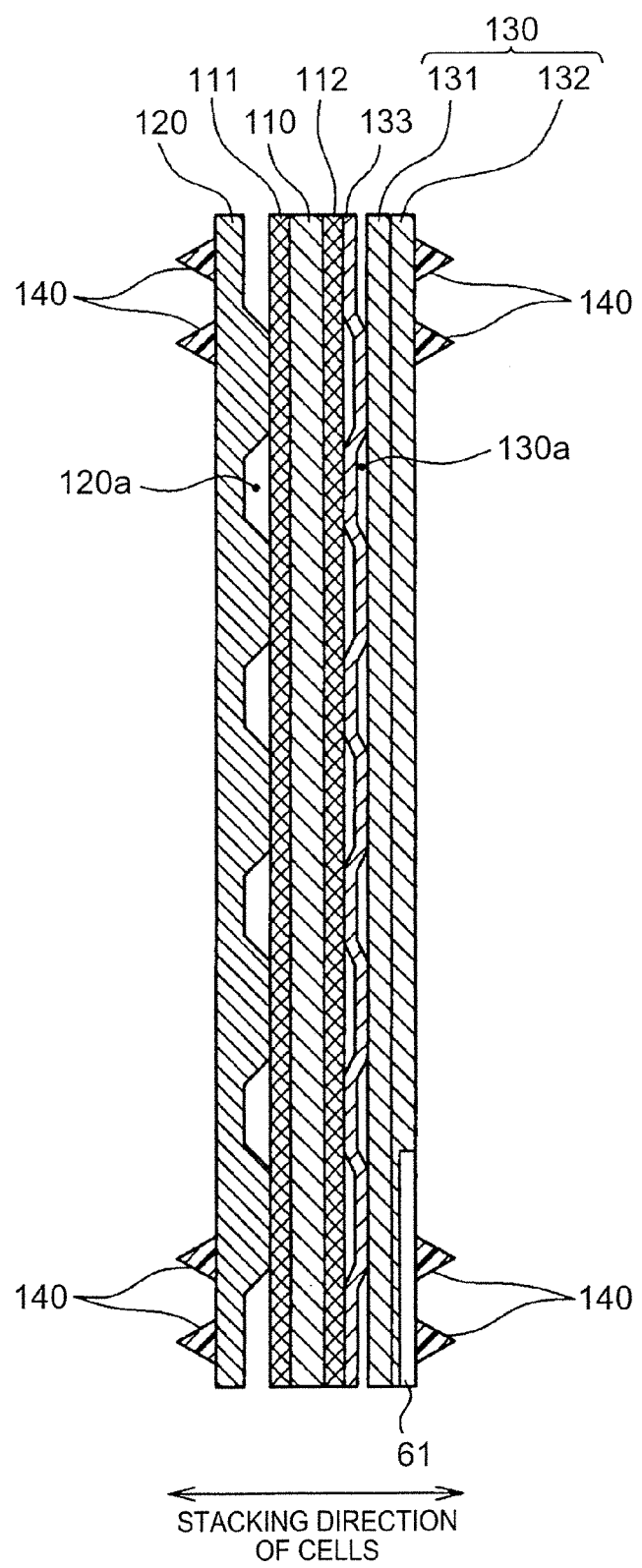
FIG. 16 is a schematic cross-sectional view of a cell of a fuel cell according to another embodiment.

(3) Further, for example, as shown in FIG. 16, the measurement part 61 of the current measurement device 60 may be disposed on a surface of an opposite side site (the second plate-shaped member 132) of a site that faces the membrane electrode assembly 110 in the cathode side separator 130. In this case, the cathode side separator 130 may be constituted of one plate-shaped member.

However, in the constitution shown in FIG. 16, when a potential detection wiring that connects the measurement part 61 and the potential difference detection circuit 62 is inserted through the inside of the gasket 140, there is apprehension that sealing performance of the gasket 140 is degraded. Therefore, the measurement part 61 of the current measurement device 60 is desirably disposed in the inside of the cathode side separator 130 or on a surface of a site (first plate-shaped member 131) that faces the gas diffusion layer 112 in the cathode side separator 130.

(4) In the above-described respective embodiments, an example in which the measurement part 61 of the current measurement device 60 is disposed integrally with the cathode side separator 130 was described. However, without limiting thereto, for example, the measurement part 61 may be disposed to the anode side separator 120.

(5) In the above-described respective embodiments, an example in which the measurement part 61 of the current measurement device 60 is disposed to one site of the cathode side separator 130 was described. However, without limiting thereto, the measurement part 61 may be disposed on a plurality of sites. In this case, an in-plane current distribution in the measurement target cell 100 can be detected.

(6) In the above-described respective embodiments, an example in which the resistance part 611 is constituted of two resistors was described. However, without limiting thereto, the resistance part 611 may be constituted of one resistor.

(7) In the above-described respective embodiments, an example in which a pair of current collector parts 612, 613 is disposed so as to sandwich the resistance part 611 in a direction orthogonal to the stacking direction of the cells 100 was described. However, the present invention is not limited thereto. As long as the pair of current collector parts 612, 613 is disposed so as to overlap with the resistance part 611 when seen from a direction orthogonal to the stacking direction of the cells 100, for example, the respective current collector parts 612, 613 may be disposed so as to be arranged side by side each other in the stacking direction of the cells 100. In this case, each of the pair of the current collector parts 612, 613 is constituted to be connected to only one end part side in a direction orthogonal to the stacking direction of the cells 100 of the resistance part 611.

(8) In the above-described respective embodiment, an example in which the current measurement device 60 of the present invention is applied to an on-vehicle fuel cell system was described. However, without limiting thereto, the current measurement device 60 of the embodiment of the present invention may be applied to other fuel cell systems.

(9) In the above-described respective embodiments, it goes without saying that elements that constitute the embodiment are not necessarily indispensable except cases clearly defined to be particularly indispensable, cases considered to be obviously indispensable from principle, or the like.

(10) In the above-described respective embodiments, when numerical values of the numbers, amounts, ranges and the like of the constituent elements of the embodiments are referred, these are not limited to the specified number except the case particularly specified to be indispensable and the case clearly limited to particular number from principle.

(11) In the above-described respective embodiments, when a shape, a positional relationship and the like of the constitutional elements and the like are referred to, these are not limited to the shape, positional relationship and the like except particularly clearly defined case and case limited to specific shape, the positional relationship and the like from principle.

What is claimed is:

1. A current measurement device that is applied to a fuel cell that is constituted by stacking and disposing cells having a membrane electrode assembly that is obtained by forming an electrode layer on each of both surfaces of an electrolyte membrane, and a first separator and a second separator that sandwich the membrane electrode assembly, and that measures a current that flows through an inside of the fuel cell, the current measurement device comprising:
a measurement part that is constituted by including a resistance part having a predetermined electric resistance value and a pair of current collector parts for extracting a potential difference generated by a current that flows through the resistance part;
a potential difference detector that is connected to the pair of current collector parts and detects a potential difference generated by the current that flows through the resistance part; and
a current detector that detects the current that flows through the inside of the fuel cell based on the detected potential difference and the predetermined electric resistance value of the resistance part,
wherein the measurement part is disposed so as to be integrated with the first separator; and
the pair of current collector parts is disposed so as to overlap with the resistance part when seen from a direction orthogonal to a stacking direction of cells.

2. The current measurement device according to claim 1, wherein
each of the pair of current collector parts is electrically connected to sites that do not overlap with each other in the resistance part when the resistance part is seen from the direction orthogonal to the stacking direction of cells.

3. The current measurement device according to claim 1, wherein
an insulating part that insulates at least one of the pair of current collector parts from the first separator is disposed between the at least one of the pair of current collector parts and the first separator.

4. The current measurement device according to claim 1, wherein
the first separator is a joined body constituted by joining a first plate-shaped member of which a first plate surface comes into electrical contact with the membrane electrode assembly and a second plate-shaped member that comes into electrical contact with a second plate surface on an opposite side of the first plate surface in the first plate-shaped member; and
the measurement part is disposed to a joint part of the first plate-shaped member and the second plate-shaped member.

5. The current measurement device according to claim 4, wherein
the first plate-shaped member is provided with a first recess;
the second plate-shaped member is provided with a second recess; and
the measurement part is disposed in a space formed by the first recess and the second recess when the first plate-shaped member and the second plate-shaped member are superposed.

6. The current measurement device according to claim 1, wherein
the measurement part is disposed on a surface that faces the membrane electrode assembly in the first separator.

7. The current measurement device according to claim 1, wherein
the measurement part is disposed on a second surface on an opposite side of a first surface that faces the membrane electrode assembly in the first separator.

8. A fuel cell comprising:
a plurality of cells stacked in a stacking direction, wherein a first cell of the plurality of cells comprises:
a first separator;
a membrane electrode assembly comprising an electrolyte membrane disposed between a first electrode and a second electrode; and
a second separator, wherein the membrane electrode assembly is sandwiched between the first separator and the second separator; and
a measurement part integrated with the first separator, wherein the measurement part comprises:
a resistance part having an electrical resistance value;
a first current collector part electrically connected to the resistance part; and a
second current collector part electrically connected to the resistance part such that the first current collector part, the resistance part, and the second current collector part are electrically connected in series, wherein a plane orthogonal to the stacking direction intersects the resistance part and at least one of the first current collector part and the second current collector part.

9. The fuel cell of claim 8, wherein:
a first plane orthogonal to the stacking direction intersects the resistance part and the first current collector; and
a second plane orthogonal to the stacking direction intersects the resistance part and the second current collector, wherein the first plane is parallel to and offset from the second plane.

10. The fuel cell of claim 8, wherein an insulating part is disposed between the first separator and at least one of the first current collector part and the second current collector part.

11. The fuel cell of claim 8, wherein the first separator is a joined body comprising:
a first plate-shaped member having a first plate surface and a second plate surface; and
a second plate-shaped member, wherein the first plate surface of the first plate-shaped member electrically contacts the membrane electrode assembly, wherein the second plate surface of the first plate-shaped member electrically contacts the second plate-shaped member, and wherein the measurement part is disposed at a joint part of the first plate-shaped member and the second plate-shaped member.

12. The fuel cell of claim 11, wherein:
the first plate-shaped member includes a first recess;
the second plate-shaped member includes a second recess; and
the measurement part is disposed in a space formed by the first recess and the second recess when the first plate-shaped member and the second plate-shaped member are in electrical contact.

13. The fuel cell of claim 8, wherein the measurement part is disposed on a surface that faces the membrane electrode assembly in the first separator.

14. The fuel cell of claim 8, wherein the measurement part is disposed on a second surface on an opposite side of a first surface that faces the membrane electrode assembly in the first separator.

15. The fuel cell of claim 8, wherein the measurement part further comprises:
a potential difference detector electrically connected to the first current collector part and the second current collector part, wherein the potential difference detector detects a potential difference generated by current that flows through the resistance part; and a current detector that detects the current that flows through the resistance part based on the detected potential difference and the electrical resistance value of the resistance part.

* * * * *